United States Patent
Kang et al.

(10) Patent No.: US 11,795,351 B2
(45) Date of Patent: Oct. 24, 2023

(54) ADHESIVE COMPOSITION AND ADHESIVE FILM COMPRISING SAME

(71) Applicant: LG Chem, Ltd., Seoul (KR)

(72) Inventors: Seongwook Kang, Daejeon (KR); Yoonkyung Kwon, Daejeon (KR); Byungsu Park, Daejeon (KR); Hui Je Lee, Daejeon (KR); Sanghun Han, Daejeon (KR)

(73) Assignee: LG Chem, Ltd.

( * ) Notice: Subject to any disclaimer, the term of this patent is extended or adjusted under 35 U.S.C. 154(b) by 535 days.

(21) Appl. No.: 16/763,828

(22) PCT Filed: Feb. 12, 2019

(86) PCT No.: PCT/KR2019/001691
§ 371 (c)(1),
(2) Date: May 13, 2020

(87) PCT Pub. No.: WO2019/164166
PCT Pub. Date: Aug. 29, 2019

(65) Prior Publication Data
US 2021/0147721 A1 May 20, 2021

(30) Foreign Application Priority Data
Feb. 20, 2018 (KR) .................. 10-2018-0020040

(51) Int. Cl.
C09J 7/40 (2018.01)
C09J 7/25 (2018.01)
(Continued)

(52) U.S. Cl.
CPC ............... *C09J 7/40* (2018.01); *B32B 7/06* (2013.01); *B32B 7/12* (2013.01); *C09J 7/255* (2018.01);
(Continued)

(58) Field of Classification Search
CPC ... C09J 7/40; C09J 7/255; C09J 133/08; C09J 2301/312; C09J 7/20; C09J 2433/00;
(Continued)

(56) References Cited

U.S. PATENT DOCUMENTS

| 4,693,935 A | 9/1987 | Mazurek |
| 2003/0178124 A1 | 9/2003 | Mikami et al. |

(Continued)

FOREIGN PATENT DOCUMENTS

| CN | 105121587 A | 12/2015 |
| CN | 103270122 B | 2/2017 |

(Continued)

OTHER PUBLICATIONS

Shin-Etsu Silicone product datasheet, available at https://www.shinetsusilicone-global.com/products/type/oil/detail/search/deg29.shtml (accessed Feb. 9, 2023) (Year: 2023).*

(Continued)

*Primary Examiner* — Scott R. Walshon
(74) *Attorney, Agent, or Firm* — Lerner David LLP

(57) ABSTRACT

An adhesive composition comprising an acrylic first polymer having a glass transition temperature of 0° C. or less, a second polymer comprising a unit derived from a monomer represented by the following Chemical Formula 1 and Chemical Formula 2 or Chemical Formula 3, and a crosslinking agent, and an adhesive film comprising the same are provided.

12 Claims, 1 Drawing Sheet

(51) Int. Cl.
*C09J 133/08* (2006.01)
*B32B 7/06* (2019.01)
*B32B 7/12* (2006.01)

(52) U.S. Cl.
CPC ....... *C09J 133/08* (2013.01); *B32B 2307/732* (2013.01); *B32B 2405/00* (2013.01); *C09J 2301/312* (2020.08)

(58) Field of Classification Search
CPC .......... C09J 2483/00; B32B 7/06; B32B 7/12; B32B 2301/732; B32B 2405/00; C08F 220/14; C08F 220/1804; C08F 220/1808; C08F 220/1809; C08F 220/1818; C08L 83/04
See application file for complete search history.

(56) References Cited

U.S. PATENT DOCUMENTS

| | | | |
|---|---|---|---|
| 2005/0253277 A1* | 11/2005 | Yamanaka | B32B 27/32 |
| | | | 257/778 |
| 2007/0213463 A1 | 9/2007 | Sherman et al. | |
| 2010/0101723 A1* | 4/2010 | Okamoto | C09J 133/08 |
| | | | 156/332 |
| 2016/0032154 A1 | 2/2016 | Kanno et al. | |
| 2017/0043566 A1 | 2/2017 | Kanno et al. | |
| 2017/0081557 A1 | 3/2017 | Shigetomi et al. | |
| 2018/0002573 A1* | 1/2018 | Kawakita | C09J 153/02 |
| 2018/0042861 A1 | 2/2018 | Fleschhut et al. | |
| 2019/0071589 A1 | 3/2019 | Ieda et al. | |
| 2019/0077999 A1 | 3/2019 | Ieda et al. | |
| 2019/0194499 A1 | 6/2019 | Kanno et al. | |
| 2021/0395581 A1* | 12/2021 | Choi | C09J 7/29 |

FOREIGN PATENT DOCUMENTS

| | | |
|---|---|---|
| CN | 106459692 A | 2/2017 |
| JP | H0734052 A | 2/1995 |
| JP | 2002294159 A | 10/2002 |
| JP | 2005350513 A | 12/2005 |
| JP | 2006299283 A | 11/2006 |
| JP | 2009530444 A | 8/2009 |
| JP | 2014224227 A | 12/2014 |
| JP | 201766334 A | 4/2017 |
| JP | 201795654 A | 6/2017 |
| JP | 2017149890 A | 8/2017 |
| KR | 20150143507 A | 12/2015 |
| KR | 101745849 B1 | 6/2017 |
| KR | 20170062369 A | 6/2017 |
| KR | 101780542 B1 | 9/2017 |
| KR | 20180087232 A | 8/2018 |
| KR | 20180087234 A | 8/2018 |
| WO | 2012093871 A1 | 7/2012 |

OTHER PUBLICATIONS

Chinese Search Report for Application No. 201980005813.0 dated Apr. 6, 2021, pp. 1-3.
International Search Report from Application No. PCT/KR2019/001691 dated May 21, 2019, 2 pages.
Taiwanese Search Report for Application No. 108105028 dated Nov. 15, 2019, 1 page.

* cited by examiner

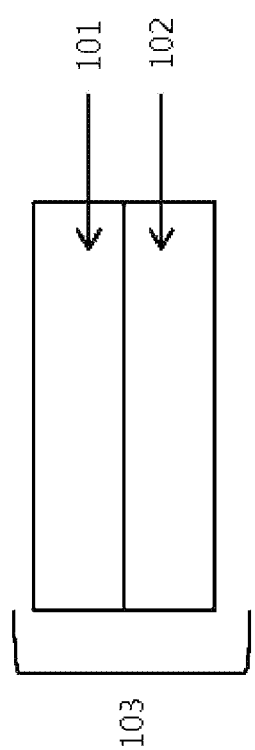

ADHESIVE COMPOSITION AND ADHESIVE FILM COMPRISING SAME

CROSS-REFERENCE TO RELATED APPLICATION

The present application is a national phase entry under 35 U.S.C. § 371 of International Application No. PCT/KR2019/001691 filed Feb. 12, 2019 which claims priority from Korean Patent Application No. 10-2018-0020040, filed with the Korean Intellectual Property Office on Feb. 20, 2018, the disclosures of which are incorporated herein by reference in their entirety.

TECHNICAL FIELD

The present specification relates to an adhesive composition and an adhesive film comprising the same.

BACKGROUND ART

Conventionally, an adhesive sheet having a high adhesive force from an early stage of adhesion is known. In addition, when fixing a substrate using such an adhesive sheet, an adhesive sheet having a sufficient adhesive force for fixing the substrate is selected.

Meanwhile, in the process of bonding an adhesive sheet to a substrate, bubbles may be generated or unexpected foreign matter may be introduced, which is undesirable in terms of appearance and adhesiveness, and an adhesive sheet often needs to be re-adhered thereto. However, an adhesive sheet having a high adhesive force is not suitable for such re-adhesion. Therefore, techniques for reducing such bubbles have been devised. For example, a technique has been devised to form a surface pattern of irregularities on the adhesive surface of a pressure-sensitive adhesive through an embossed liner. In this case, even if air bubbles are incorporated between the pressure-sensitive adhesive and the substrate, when bonding the pressure-sensitive adhesive to the substrate, the air readily flows to the outside through surface grooves of the pressure-sensitive adhesive, thus easily removing bubbles without re-adhesion. However, the pressure-sensitive adhesive described above requires a predetermined thickness in order to form grooves. Further, when the pressure-sensitive adhesive is weakly adhered to a substrate, the adhesive area becomes small due to the presence of grooves, so that an operation such as rework or re-positioning is easy to perform, but a sufficient adhesive force may not be obtained.

Therefore, when taking such circumstances into consideration, there is a need for development of an adhesive sheet that is capable of exerting an adhesive force required for fixing a substrate and efficiently removing foreign matter and bubbles that may be generated between the adhesive sheet and the substrate.

DISCLOSURE

Technical Problem

The present specification is directed to providing an adhesive composition and an adhesive film comprising the same.

Technical Solution

One embodiment of the present specification provides an adhesive composition comprising: an acrylic first polymer having a glass transition temperature of 0° C. or less; a second polymer comprising a unit derived from a monomer represented by the following Chemical Formula 1 and a unit derived from a monomer represented by the following Chemical Formula 2 or Chemical Formula 3; and a crosslinking agent:

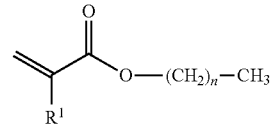
[Chemical Formula 1]

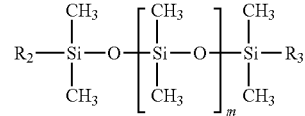
[Chemical Formula 2]

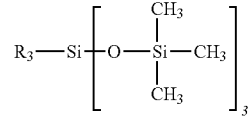
[Chemical Formula 3]

wherein in the above Chemical Formulae 1 to 3,
$R_1$ is hydrogen or a methyl group;
$R_2$ is hydrogen, or an alkyl group;
$R_3$ is monofunctional acrylate;
m is an integer of 0 to 200; and
n is an integer of 10 to 30.

Another embodiment of the present specification provides an adhesive film comprising: a substrate layer; and an adhesive sheet provided on one surface of the substrate layer and containing the adhesive composition according to one embodiment of the present specification.

Still another embodiment of the present specification provides a method for producing an adhesive film comprising: preparing a substrate layer; and coating one surface of the substrate layer with the adhesive composition according to one embodiment of the present specification to form an adhesive sheet.

Advantageous Effects

An adhesive sheet produced using the adhesive composition comprising an acrylic first polymer having a glass transition temperature of 0° C. or less, and a second polymer comprising the unit derived from a monomer represented by Chemical Formula 1 and the unit derived from a monomer represented by Chemical Formula 2 or 3 according to an embodiment of the present specification, is reworkable due to low early adhesive force upon incorrect bonding causing generation of bubbles and foreign matter, when the adhesive sheet is adhered to a substrate in an early stage.

Also, the adhesive sheet can exhibit excellent variability enabling improvement of adhesive force to a substrate after a certain process.

In particular, the adhesive composition wherein n of the monomer represented by Chemical Formula 1 above is 10 or more can exhibit particularly excellent variability.

DESCRIPTION OF DRAWINGS

FIGURE shows a laminate structure of an adhesive film according to an embodiment of the present specification.

BEST MODE FOR DISCLOSURE

Hereinafter, the present specification will be described in more detail.

In the present specification, it will be understood that, when a portion is referred to as "including" one element, the portion may further include another element and does not preclude the presence thereof, unless clearly mentioned otherwise.

The embodiments of the present specification will be described with reference to the annexed drawings such that they can be easily implemented by those skilled in the field to which the present invention pertains. However, the present invention can be implemented in a variety of different forms and is not limited to the embodiments described herein.

One embodiment of the present specification provides an adhesive composition comprising: an acrylic first polymer having a glass transition temperature of 0° C. or less; a second polymer comprising a unit derived from a monomer represented by the following Chemical Formula 1 and a unit derived from a monomer represented by the following Chemical Formula 2 or Chemical Formula 3; and a cross-linking agent:

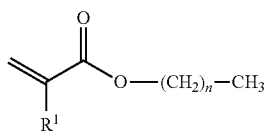

[Chemical Formula 1]

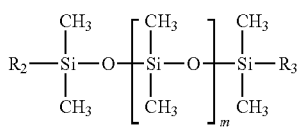

[Chemical Formula 2]

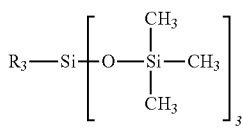

[Chemical Formula 3]

wherein in the above Chemical Formulae 1 to 3,
$R_1$ is hydrogen or a methyl group;
$R_2$ is hydrogen, or an alkyl group;
$R_3$ is monofunctional acrylate;
m is an integer of 0 to 200; and
n is an integer of 10 to 30.

In an embodiment of the present specification, $R_1$ may be hydrogen.

In another embodiment of the present specification, $R_1$ may be a methyl group.

In an embodiment of the present specification, $R_2$ may be hydrogen, or an alkyl group having 1 to 30 carbon atoms.

In an embodiment of the present specification, $R_3$ is a functional group having a (meth)acrylic group, and "functional group having a (meth)acrylic group" may mean a (meth)acrylic group alone, or having a (meth)acrylic group as a functional group and further comprising another organic group.

In an embodiment of the present specification, $R_3$ may be represented by the following Chemical Formula 4:

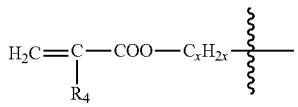

[Chemical Formula 4]

wherein in the above Chemical Formula 4,
$R_4$ is hydrogen or an alkyl group; and
x is an integer of 0 or more.

In an embodiment of the present specification, $R_4$ may be hydrogen, or an alkyl group having 1 to 30 carbon atoms.

In another embodiment, $R_4$ may be hydrogen, or an alkyl group having 1 to 10 carbon atoms.

In another embodiment, $R_4$ may be hydrogen, or a methyl group.

In an embodiment of the present specification, x may be an integer of 0 or more, preferably an integer of not less than 0 and not more than 100, more preferably an integer of not less than 0 and not more than 50.

In an embodiment of the present specification, m may be an integer of 0 to 200.

In another embodiment, m may be an integer of not less than 0 and not more than 200, preferably an integer of not less than 0 and not more than 190, more preferably of not less than 0 and not more than 150.

In an embodiment of the present specification, n may be an integer of 10 to 30.

In another embodiment, n may be an integer of 10 to 30, preferably an integer of 10 to 28, more preferably an integer of 10 to 25.

In an embodiment of the present specification, when $R_1$ is hydrogen, n is an integer of 13 to 30, preferably an integer of 13 to 28, more preferably an integer of 14 to 25.

In an embodiment of the present specification, when $R_1$ is a methyl group, n may be an integer of 16 to 30, preferably an integer of 16 to 28, more preferably an integer of 16 to 25.

When n is within the range described above, an alkyl moiety of the unit derived from a monomer represented by Chemical Formula 1 has a structure of an alkyl group of a long chain. In this case, compared to a monomer having an alkyl group of a short chain having a smaller number of carbon atoms, change properties in early and late adhesive forces are particularly excellent, more stable arrangement between monomers is realized after thermal treatment and thus adhesive properties are particularly excellent.

In addition, when the alkyl moiety of the unit derived from a monomer represented by Chemical Formula 1 is cyclic, arrangement of monomers is non-uniform compared to the chain alkyl moiety according to the present invention and thus the subsequent adhesive properties are deteriorated.

In particular, in case of the unit derived from a monomer represented by Chemical Formula 1, the chain of the alkyl moiety is within the range of not less than a predetermined n, thereby providing excellent change properties of adhesive force, stable arrangement between monomers and thus superior adhesive properties. That is, the second polymer has a melting temperature (Tm) behavior and thus provides particularly excellent change properties of early and late adhesive forces, more stable arrangement between monomers after thermal treatment and highly excellent adhesive properties.

In an embodiment of the present specification, as a polymer included in the second polymer, the unit derived from a monomer represented by Chemical Formula 1 may be one type.

In an embodiment of the present specification, as a polymer included in the second polymer, the unit derived from a monomer represented by Chemical Formula 1 may be one or more types.

In an embodiment of the present specification, as a polymer included in the second polymer, the unit derived from a monomer represented by Chemical Formula 1 may be not less than one type and not more than three types.

In an embodiment of the present specification, as a polymer included in the second polymer, the unit derived from a monomer represented by Chemical Formula 1 may be two types.

That is, as a polymer included in the second polymer, the unit derived from a monomer represented by Chemical Formula 1 may be one type, in other words, a homopolymer, or the unit derived from a monomer represented by Chemical Formula 1 may be one or more types, in other words, a copolymer.

In an embodiment of the present specification, when the unit derived from a monomer represented by Chemical Formula 1 is a copolymer comprising one or more types, n in Chemical Formula 1 may satisfy an integer of not less than 10 and not more than 30. That is, as compared to when the unit derived from a monomer represented by Chemical Formula 1 is a homopolymer comprising one type, when the unit is a copolymer, even if n in Chemical Formula 1 has a broader range, the subsequent change properties (variability) of an adhesive film can be exhibited.

In an embodiment of the present specification, the acrylic first polymer may comprise a (meth)acrylate resin having a weight average molecular weight of 100,000 to 5,000,000.

The weight average molecular weight is an average molecular weight which is non-uniform and is used based on a molecular weight of a polymer substance, which is obtained by averaging a molecular weight of an ingredient molecule species of a polymer compound having a molecular weight distribution as a weight fraction.

The weight average molecular weight can be measured by analysis of gel permeation chromatography (GPC).

In the present specification, (meth)acrylate encompasses both acrylate and methacrylate. The (meth)acrylate resin is, for example, a copolymer of a (meth)acrylic acid ester monomer and a crosslinkable functional group-containing monomer.

The (meth)acrylic acid ester monomer is not particularly limited, but is for example alkyl (meth)acrylate, more specifically a monomer having an alkyl group having 1 to 12 carbon atoms, which may comprise one type, or two or more types of pentyl (meth)acrylate, n-butyl (meth)acrylate, ethyl (meth)acrylate, methyl (meth)acrylate, hexyl (meth)acrylate, n-octyl (meth)acrylate, isooctyl (meth)acrylate, 2-ethylhexyl (meth)acrylate, dodecyl (meth)acrylate and decyl (meth)acrylate.

The crosslinkable functional group-containing monomer is not particularly limited, but may, for example, comprise one type, or two or more types of a hydroxyl group-containing monomer, a carboxyl group-containing monomer and a nitrogen-containing monomer.

For example, the hydroxyl group-containing compound may be 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, 2-hydroxypropyleneglycol (meth)acrylate or the like.

For example, the carboxyl group-containing compound may be (meth)acrylic acid, 2-(meth)acryloyloxyacetic acid, 3-(meth)acryloyloxypropyl acid, 4-(meth)acryloyloxybutyl acid, an acrylic acid dimer, itaconic acid, maleic acid, maleic anhydride or the like.

For example, the nitrogen-containing monomer may be (meth)acrylonitrile, N-vinyl pyrrolidone, N-vinyl caprolactam or the like.

From the viewpoint of improvement of other functionality such as compatibility, the (meth)acrylate resin may be further co-polymerized with at least one of vinyl acetate, styrene and acrylonitrile.

In an embodiment of the present specification, the acrylic first polymer may have a glass transition temperature of 0° C. or less.

In another embodiment, the glass transition temperature of the acrylic first polymer may be not less than −110° C. and not more than 0° C., preferably not less than −90° C. and not more than 0° C., more preferably not less than −70° C. and not more than 0° C.

When the glass transition temperature of the acrylic first polymer satisfies the range, the adhesive force is highly improved during subsequent thermal treatment. When the glass transition temperature (Tg) of the first polymer is higher than 0° C., the flow of the polymer may be difficult and improvement in adhesive force over time may be deteriorated.

The glass transition temperature of the present specification is obtained by plotting heat absorption and emission amounts of a substance caused by phase transition as a function of temperature using a differential scanning calorimeter (DSC, Mettler), when about 10 mg of a sample is charged into a pan for exclusive use and heated under a constant temperature elevation environment.

Specifically, the glass transition temperature may be a nominal value described in the literature, catalog or the like, or a value calculated based on the following General Formula (1)(Fox formula):

$$1/Tg = W1/Tg1 + W2/Tg2 + \ldots + Wn/Tgn \quad \text{[General Formula (1)]}$$

wherein in the above General Formula (1), Tg represents a glass transition temperature (unit: K) of polymer A, Tgi (i=1, 2, ... n) represents a glass transition temperature (unit: K) when monomer i forms a homopolymer, and Wi (i=1, 2, ... n) represents a weight fraction of monomer i with respect to the entire monomer ingredients.

General Formula (1) means a calculation formula when polymer A contains n types of monomer ingredients such as monomer 1, monomer 2, ..., monomer n.

In an embodiment of the present specification, the acrylic first polymer may comprise 50 to 70 parts by weight of alkyl acrylate, 5 to 40 parts by weight of alkyl methacrylate and 1 to 30 parts by weight of hydroxyalkyl acrylate.

The feature that the acrylic first polymer comprises 50 to 70 parts by weight of alkyl acrylate, 5 to 40 parts by weight of alkyl methacrylate and 1 to 30 parts by weight of hydroxyalkyl acrylate means that the alkyl acrylate monomer, the alkyl methacrylate monomer and the hydroxyalkyl acrylate monomer are polymerized at the weight ratio.

In an embodiment of the present specification, the acrylic first polymer may comprise 50 to 70 parts by weight, preferably 55 to 70 parts by weight, more preferably 60 to 70 parts by weight of alkyl acrylate.

In an embodiment of the present specification, the acrylic first polymer may comprise 5 to 40 parts by weight, preferably 7 to 35 parts by weight, more preferably 10 to 30 parts by weight of alkyl methacrylate.

In an embodiment of the present specification, the acrylic first polymer may comprise 1 to 30 parts by weight, preferably 5 to 25 parts by weight, more preferably 5 to 20 parts by weight of hydroxyalkyl acrylate.

The alkyl acrylate and alkyl methacrylate may comprise, as a monomer having an alkyl group having 1 to 12 carbon atoms, one type, or two or more types of pentyl (meth)acrylate, n-butyl (meth)acrylate, ethyl (meth)acrylate, methyl (meth)acrylate, hexyl (meth)acrylate, n-octyl (meth)acrylate, isooctyl (meth)acrylate, 2-ethylhexyl (meth)acrylate, dodecyl (meth)acrylate and decyl (meth)acrylate.

For example, the hydroxyalkyl acrylate may be 2-hydroxyethyl acrylate, 2-hydroxypropyl acrylate, 4-hydroxybutyl acrylate, 6-hydroxyhexyl acrylate, 8-hydroxyoctyl acrylate, 2-hydroxyethyleneglycol acrylate, 2-hydroxypropyleneglycol acrylate or the like.

In an embodiment of the present specification, the second polymer may comprise the unit derived from a monomer represented by Chemical Formula 1 and the unit derived from a monomer represented by Chemical Formula 2 or 3.

In another embodiment, the second polymer may comprise the unit derived from a monomer represented by Chemical Formula 1 and the unit derived from a monomer represented by Chemical Formula 2.

In an embodiment of the present specification, a content of the second polymer may be 0.1 parts by weight to 20 parts by weight, based on 100 parts by weight of the first polymer.

In another embodiment, a content of the second polymer may be 0.5 to 17 parts by weight, preferably 1 to 13 parts by weight, based on 100 parts by weight of the first polymer.

When the adhesive composition contains the first polymer and the second polymer at the weight ratio within the range defined above, it can provide easy rework owing to low early adhesive force upon bonding to an adherent and has high adhesive force after the thermal treatment process.

In an embodiment of the present specification, a content of the unit derived from a monomer represented by Chemical Formula 2 or 3 may be 1 part by weight to 70 parts by weight, based on 100 parts by weight of the second polymer.

In another embodiment, a content of the unit derived from a monomer represented by Chemical Formula 2 or 3 may be 1 part by weight to 50 parts by weight, preferably 1 part by weight to 30 parts by weight, based on 100 parts by weight of the second polymer.

In another embodiment, a content of the unit derived from a monomer represented by Chemical Formula 2 may be 1 part by weight to 50 parts by weight, preferably 1 part by weight to 30 parts by weight, based on 100 parts by weight of the second polymer.

In an embodiment of the present specification, a content of the unit derived from a monomer represented by Chemical Formula 1 may be 30 parts by weight to 99 parts by weight, based on 100 parts by weight of the second polymer.

In another embodiment, a content of the unit derived from a monomer represented by Chemical Formula 1 may be 35 parts by weight to 95 parts by weight, preferably 35 parts by weight to 90 parts by weight, based on 100 parts by weight of the second polymer.

When the contents of the unit derived from a monomer represented by Chemical Formula 1 and the unit derived from a monomer represented by Chemical Formula 2 with respect to the second polymer satisfy the ranges, there are effects of providing easy rework owing to low early adhesive force upon bonding to an adherent and high adhesive force after the thermal treatment process.

The second polymer may further comprise a monomer other than the unit derived from a monomer represented by Chemical Formula 1 and the unit derived from a monomer represented by Chemical Formula 2, and the monomer may comprise (meth)acrylate described above.

In an embodiment of the present specification, the adhesive composition may further comprise one or more selected from the group consisting of a solvent, a dispersant, a photoinitiator, a thermal initiator and a tackifier.

The solvent may be a generally used organic solvent such as toluene or ethyl acetate, or may be a polar aprotic solvent, specifically methylethyl ketone.

In an embodiment of the present specification, the crosslinkable compound may comprise at least one selected from the group consisting of: compounds obtained by esterifying polyhydric alcohols such as hexanediol di(meth)acrylate, ethylene glycol di(meth)acrylate, polyethylene glycol di(meth)acrylate having 2 to 14 ethylene groups, trimethylolpropane di(meth)acrylate, trimethylolpropane tri(meth)acrylate, pentaerythritol tri(meth)acrylate, pentaerythritol tetra(meth)acrylate, 2-trisacryloyloxymethylethylphthalic acid, propylene glycol di(meth)acrylate having 2 to 14 propylene groups, dipentaerythritol penta(meth)acrylate, dipentaerythritol hexa(meth)acrylate, or a mixture of an acid-modified product of dipentaerythritol penta(meth)acrylate and dipentaerythritol hexa(meth)acrylate (commercially available from Toagosei Co., Ltd., Japan, under the trade names of TO-2348 and TO-2349) with $\alpha,\beta$-unsaturated carboxylic acid; compounds obtained by adding (meth)acrylic acid to glycidyl group-containing compounds such as trimethylolpropane triglycidyletheracrylic acid adducts and bisphenol A diglycidyletheracrylic acid adducts; ester compounds of compounds having hydroxyl groups or ethylenically unsaturated bonds, such as diester phthalate of $\beta$-hydroxyethyl (meth)acrylate and toluene diisocyanate adducts of $\beta$-hydroxyethyl (meth)acrylate, with polycarboxylic acid, or their adducts with polyisocyanate; (meth)acrylate alkyl ester such as methyl(meth)acrylate, ethyl(meth)acrylate, butyl(meth)acrylate, and 2-ethylhexyl(meth)acrylate; and 9,9'-bis[4-(2-acryloyloxyethoxy) phenyl]fluorene, but is not limited thereto. General compounds known in the technical field to which the present invention pertains may be used.

In an embodiment of the present specification, the photoinitiator may be substituted with one or more substituents selected from the group consisting of a triazine-based compound, a biimidazole-based compound, an acetophenone-based compound, an O-acyloxime-based compound, a thioxantone-based compounds, a phosphine oxide-based compound, a coumarin-based compound and a benzophenone-based compound.

Specifically, in an embodiment of the present specification, the photoinitiator may comprise one, or a mixture of two or more selected from a triazine-based compound such as 2,4-trichloromethyl-(4'-methoxyphenyl)-6-triazine, 2,4-trichloromethyl-(4'-methoxystyryl)-6-triazine, 2,4-trichloromethyl-(fipronil)-6-triazine, 2,4-trichloromethyl-(3',4'-dimethoxyphenyl)-6-triazine, 3-{4-[2,4-bis(trichloromethyl)-s-triazin-6-yl]phenylthio} propanoic acid, 2,4-trichloromethyl-(4'-ethylbiphenyl)-6-triazine or 2,4-trichloromethyl-(4'-methylbiphenyl)-6-triazine; a biimidazole-based compound such as 2,2'-bis(2-chlorophenyl)-4,4',5,5'-tetraphenylbiimidazole or 2,2'-bis(2,3-dichlorophenyl)-4,4',5,5'-tetraphenylbiimidazole; an acetophenone-based compound such as 2-hydroxy-2-methyl-1-phenylpropan-1-one, 1-(4-isopropylphenyl)-2-hydroxy-2-methylpropan-1-one, 4-(2-hydroxyethoxy)-phenyl(2-hydroxy)propyl ketone, 1-hydroxycyclohexyl phenyl ketone, 2,2-dimethoxy-2-phenyl acetophenone, 2-methyl-(4-methylthiophenyl)-2-morpholino-1-propan-1-one (Irgacure-907) or 2-benzyl-2-dimethylamino-1-(4-morpholinophenyl)-butan-1-one (Irgacure-369); an O-acyloxime-based compound such as Irgacure OXE 01 or Irgacure OXE 02 produced by Ciba Geigy Co., Ltd.; a benzophenone-based compound such as 4,4'-bis(dimethylamino)benzophenone or 4,4'-bis(diethylamino)benzophenone; a thioxantone-based compound such as 2,4-diethyl thioxantone, 2-chlorothioxantone, isopropyl thioxantone or diisopropyl thioxantone; a phosphine oxide-based compound such as 2,4,6-trimethylbenzoyl diphenylphosphine oxide, bis(2,6-dimethoxybenzoyl)-2,4,4-trimethylpentyl phosphine oxide or bis(2,6-dichlorobenzoyl) propyl phosphine oxide; and a coumarin-based compound such as 3,3'-carbonylvinyl-7-(diethylamino)coumarin, 3-(2-benzothiazolyl)-7-(diethylamino)coumarin, 3-benzoyl-7-(diethylamino) coumarin, 3-benzoyl-7-methoxy-coumarin or 10,10'-carbonylbis[1,1,7,7-tetramethyl-2,3,6,7-tetrahydro-1H,5H, 11H-C1]-benzopyrano[6,7,8-ij]-quinolizin-11-one, but is not limited thereto.

Also, the photoinitiator may be selected from those well-known in the art.

An embodiment of the present specification provides: an adhesive film comprising: a substrate layer; and an adhesive sheet provided on one surface of the substrate layer and containing the adhesive composition according to one embodiment of the present specification or a cured substance thereof.

Another embodiment of the present specification provides an adhesive film comprising a release sheet on one surface of the adhesive sheet.

The term "comprising a release sheet on one surface of the adhesive sheet" means that the release sheet is provided on a surface opposite to a surface of the adhesive sheet contacting the substrate layer.

In an embodiment of the present specification, the release sheet may be a hydrophobic film, may mean a transparent layer attached to one surface of the adhesive sheet in order to protect the very thin adhesive sheet, and may be a film that has excellent mechanical strength, thermal stability, waterproofness, isotropy or the like. For example, the release sheet may be an acetate-based {such as triacetylcellulose (TAC)}, polyester-based, polyethersulphone-based, polycarbonate-based, polyamide-based, polyimide-based, polyolefin-based, cycloolefin-based, polyurethane-based or acryl-based resin film, or the like, but any commercially available silicone-treated release sheet may be used without any limitation.

In an embodiment of the present specification, the substrate layer may be selected from the group consisting of polyethylene terephthalate (PET), polyester, polycarbonate (PC), polyimide (PI), polyethylene naphthalate (PEN), polyether ether ketone (PEEK), polyarylate (PAR), polycyclic olefin (PCO), polynorbornene, polyethersulphone (PES) and COP (cyclo olefin polymer).

The adhesive sheet may be formed by coating the substrate layer with the adhesive composition described above, drying the same, covering the coating surface with a release sheet and aging the same under conditions of 40° C. for 2 days or longer.

In an embodiment of the present specification, the adhesive sheet may have an early adhesive force after bonding to stainless steel (SUS304 substrate) of 100 gf/inch or less, and a late adhesive force after thermal treatment of 300 gf/inch or more.

In another embodiment, the adhesive sheet may have an early adhesive force, after bonding to stainless steel (SUS304 substrate) and then allowing to stand at 23° C. for 2 hours, of 100 gf/inch or less, and a late adhesive force, after thermal treatment at 70° C. for 20 minutes, of 300 gf/inch or more.

The early adhesive force and the late adhesive force are measured at an angle of 180° and a peel (detachment) rate of 1,800 mm/min with a texture analyzer (Stable Micro Systems Ltd.) and are measured 2 hours in an early stage and 2 hours after thermal treatment, respectively, after attaching the adhesive sheet produced according to the present invention to stainless steel (304 mirror substrate) by pressing back and forth one time with a 2 kg rubber roller.

In an embodiment of the present specification, the early adhesive force of the adhesive sheet may be 100 gf/inch or less, preferably 80 gf/inch or less, more preferably 75 gf/inch or less.

In another embodiment, the early adhesive force of the adhesive sheet may be 5 gf/inch or more.

In an embodiment of the present specification, the late adhesive force of the adhesive sheet may be 300 gf/inch or more, preferably 350 gf/inch or more, more preferably 400 gf/inch or more.

In another embodiment, the late adhesive force of the adhesive sheet may be 3000 gf/inch or less, preferably 2500 gf/inch or less.

One embodiment of the present specification provides an adhesive film having the late adhesive force, which is not less than 3 times and not more than 100 times, preferably not less than 5 times and not more than 100 times, more preferably not less than 10 times and not more than 100 times, of the early adhesive force.

In an embodiment of the present specification, the adhesive sheet may have a thickness of not less than 3 μm and not more than 500 μm, preferably not less than 5 μm and not more than 400 μm, more preferably not less than 7 μm and not more than 200 μm.

When the thickness of the adhesive sheet satisfies the range, rework property is excellent upon incorrect bonding, in particular, foreign matter is not left behind after removal of the adhesive sheet.

Another embodiment of the present specification provides a method for producing an adhesive film comprising: preparing a substrate layer; and coating one surface of the substrate layer with the adhesive composition according to one embodiment of the present specification to form an adhesive sheet.

In an embodiment of the present specification, the method may further comprise drying the adhesive sheet after forming the adhesive sheet on one surface of the substrate layer.

A temperature of the drying may be not less than 50° C. and not more than 200° C.

[Mode for Disclosure]

Hereinafter, examples of the present specification will be described in detail such that they can be easily implemented by those skilled in the art. However, the present specification can be implemented in different forms and is not limited to examples described herein.

Preparation Example

<Polymerization of First Polymer>

Ethylhexylacrylate (EHA)/methylmethacrylate (MMA)/hydroxyethylacrylate (HEA) were added at a weight ratio of 65/25/15 to ethyl acetate (EA) and then azobisisobutyronitrile (AIBN) was added as a photopolymerization initiator thereto to prepare a first polymer having a weight average molecular weight of 1,000,000.

<Polymerization of Second Polymer>

FM-0721 (Chisso Corp.) as reactive siloxane and (meth) acrylate shown in the following Table 1 were added at a weight ratio of 20/80 to toluene, and azobisisobutyronitrile (AIBN) was added thereto as a photopolymerization initiator to prepare a second polymer having a weight average molecular weight of 60,000.

<Production of Adhesive Sheet>

1 part by weight of an isocyanate crosslinking agent (DR7030HD produced by SAM YOUNG INK & PAINT MFG, CO., LTD.) was added to 100 parts by weight of a first polymer, 4 parts by weight of a second polymer was added thereto, and the resulting mixture was diluted with a toluene solution such that a solid content was adjusted to 20%.

A double-sided anti-static (AS) polyethylene terephthalate (PET) film (T91455 produced by MPI Corporation) was coated to a thickness of 15 μm with the adhesive sheet composition, and a double-sided anti-static (AS) polyethylene terephthalate (PET) (RF12AS) was applied thereto, followed by aging at 40° C. for 2 days to produce an adhesive sheet.

The ingredients and weight ratio of the adhesive sheet composition used for Examples and Comparative Examples of the present specification are shown in the following Table 1.

TABLE 1

| | First polymer (weight ratio) | Second polymer Monomer (weight ratio) | Weight average molecular weight | Parts by weight |
|---|---|---|---|---|
| Example 1 | EHA/MMA/HEA (65/20/15) | Octadecyl methacrylate/FM-0721 (80/20) | 60,000 | 4 |
| Example 2 | EHA/MMA/HEA (65/20/15) | Docosyl acrylate/FM-0721 (80/20) | 60,000 | 4 |
| Example 3 | EHA/MMA/HEA (65/20/15) | Octadecyl acrylate/FM-0721 (80/20) | 60,000 | 4 |
| Example 4 | EHA/MMA/HEA (65/20/15) | Hexadecyl acrylate/FM-0721 (80/20) | 60,000 | 4 |
| Example 5 | EHA/MMA/HEA (65/20/15) | Dodecyl acrylate/Docosyl acrylate/FM-0721 (20/60/20) | 60,000 | 4 |
| Comparative Example 1 | EHA/MMA/HEA (65/20/15) | — | | |
| Comparative Example 2 | EHA/MMA/HEA (65/20/15) | Methyl methacrylate/FM-0721 (80/20) | 60,000 | 4 |
| Comparative Example 3 | EHA/MMA/HEA (65/20/15) | Butyl methacrylate/FM-0721 (80/20) | 60,000 | 4 |
| Comparative Example 4 | EHA/MMA/HEA (65/20/15) | Nonyl methacrylate/FM-0721 (80/20) | 60,000 | 4 |

Measurement results of early adhesive force, late adhesive force, rework properties and reliability of Examples 1 to 4 and Comparative Examples 1 to 4 are shown in the following Table 2.

TABLE 2

| | Early adhesive force (gf/in) | Late adhesive force (gf/in) | Rework | Reliability |
|---|---|---|---|---|
| Example 1 | 52 | 1380 | OK | OK |
| Example 2 | 38 | 2153 | OK | OK |
| Example 3 | 45 | 1767 | OK | OK |
| Example 4 | 73 | 1042 | OK | OK |
| Example 5 | 51 | 1648 | OK | OK |
| Comparative Example 1 | 628 | 960 | NG | OK |
| Comparative Example 2 | 42 | 47 | OK | NG |
| Comparative Example 3 | 153 | 692 | NG | OK |
| Comparative Example 4 | 202 | 653 | NG | OK |

The early adhesive force and late adhesive force in Table 2 were measured at an angle of 180° and at a peel (detachment) rate of 1,800 mm/min using a texture analyzer (Stable Micro Systems Ltd.), and were measured 2 hours in an early stage and 2 hours after thermal treatment, respectively, after attaching the adhesive sheet produced according to the present invention to stainless steel (SUS304 substrate) by pressing back and forth one time with a 2 kg rubber roller.

As can be seen from Table 2 above, the alkyl moiety of the unit derived from a monomer represented by Chemical Formula 1 according to the present specification has a structure of an alkyl group of a long chain. In this case, change properties in early and late adhesive force are particularly excellent, compared to a monomer having an alkyl group of a short chain having a smaller number of carbon atoms. More stable arrangement between monomers is realized after thermal treatment and thus adhesive properties are highly excellent.

Specifically, in the case of Examples 1 to 5 in Table 2 wherein n of a monomer is an integer of 10 or more, variability (change properties) and reliability are excellent, as compared to Comparative Examples 2 to 4 (wherein n of a monomer is less than 10). In particular, Example 5 using a copolymer containing a combination of two types of monomers having n of 10 or more exhibits better variability and reliability than those of Comparative Examples 1 to 4. The reason for this is that the arrangement between monomers becomes more stable after the thermal treatment process and thus adhesive properties are particularly excellent.

REFERENCE NUMERAL

101: Adhesive sheet
102: Substrate layer
103: Adhesive film

The invention claimed is:
1. An adhesive composition comprising:
   an acrylic first polymer having a glass transition temperature of 0° C. or less;
   a second polymer comprising a unit derived from a monomer represented by Chemical Formula 1 and a unit derived from a monomer represented by Chemical Formula 2 or Chemical Formula 3; and
a crosslinking agent,
wherein the acrylic first polymer comprises 50 to 70 parts by weight of alkyl acrylate, 5 to 40 parts by weight of alkyl methacrylate, and 1 to 30 parts by weight of hydroxyalkyl acrylate, based on 100 parts by weight of the acrylic first polymer,
wherein a content of the second polymer is 0.1 parts by weight to 20 parts by weight, based on 100 parts by weight of the acrylic first polymer,
wherein a content of the unit derived from the monomer represented by Chemical Formula 1 is 35 parts by weight to 90 parts by weight, based on 100 parts by weight of the second polymer:

[Chemical Formula 1]

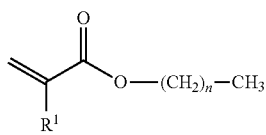

[Chemical Formula 2]

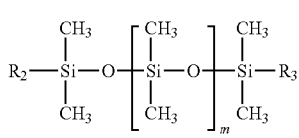

[Chemical Formula 3]

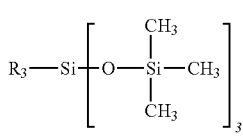

wherein in Chemical Formulae 1 to 3,
$R_1$ is hydrogen or a methyl group;
$R_2$ is hydrogen, or an alkyl group;
$R_3$ is monofunctional acrylate;
m is an integer of 0 to 200; and
n is an integer of 10 to 30.

2. The adhesive composition of claim 1, wherein the second polymer comprises the unit derived from the monomer represented by Chemical Formula 1 and the unit derived from the monomer represented by Chemical Formula 2.

3. The adhesive composition of claim 1, wherein a content of the unit derived from the monomer represented by Chemical Formula 2 or 3 is 10 parts by weight to 65 parts by weight, based on 100 parts by weight of the second polymer.

4. The adhesive composition of claim 1, wherein the adhesive composition further comprises one or more selected from a solvent, a dispersant, a photoinitiator, a thermal initiator or a tackifier.

5. An adhesive film comprising:
a substrate layer; and
an adhesive sheet provided on one surface of the substrate layer and containing the adhesive composition according to claim 1 or a cured product thereof.

6. The adhesive film of claim 5, comprising a release sheet on one surface of the adhesive sheet.

7. The adhesive film of claim 5, wherein the adhesive sheet has an initial adhesive force, after bonding to stainless steel (SUS304 substrate) and then allowing to stand at 23° C. for 2 hours, of 100 gf/inch or less, and a later adhesive force, after thermal treatment at 70° C. for 20 minutes, of 300 gf/inch or more.

8. The adhesive film of claim 7, wherein the later adhesive force is not less than 3 times and not more than 100 times of the initial adhesive force.

9. The adhesive film of claim 5, wherein the adhesive sheet has a thickness of not less than 3 μm and not more than 500 μm.

10. A method for producing an adhesive film comprising:
preparing a substrate layer; and
coating one surface of the substrate layer with the adhesive composition according to claim 1 to form an adhesive sheet.

11. The method of claim 10, further comprising drying the adhesive sheet after forming the adhesive sheet on one surface of the substrate layer.

12. An adhesive composition comprising:
an acrylic first polymer having a glass transition temperature of 0° C. or less;
a second polymer comprising a unit derived from a monomer represented by Chemical Formula 1 and a unit derived from a monomer represented by Chemical Formula 2 or Chemical Formula 3; and
a crosslinking agent,
wherein a content of the second polymer is 0.1 parts by weight to 20 parts by weight, based on 100 parts by weight of the acrylic first polymer,
wherein a content of the unit derived from the monomer represented by Chemical Formula 1 is 35 parts by weight to 90 parts by weight, based on 100 parts by weight of the second polymer:

[Chemical Formula 1]

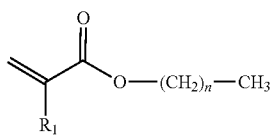

[Chemical Formula 2]

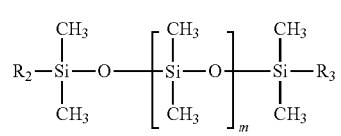

[Chemical Formula 3]

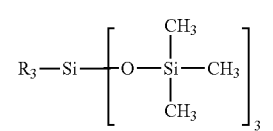

wherein in Chemical Formulae 1 to 3,
$R_1$ is hydrogen or a methyl group;
$R_2$ is hydrogen, or an alkyl group;
$R_3$ is monofunctional acrylate;
m is an integer of 0 to 200; and
n is an integer of 20 to 30.

* * * * *